(12) United States Patent
Weber et al.

(10) Patent No.: US 10,851,913 B2
(45) Date of Patent: Dec. 1, 2020

(54) SYSTEMS AND METHODS FOR A PLUG HEAD ASSEMBLY

(71) Applicant: CALDERA ENGINEERING, LC, Provo, UT (US)

(72) Inventors: Ryan Weber, Provo, UT (US); Jeffrey Robison, Provo, UT (US); Joseph Prince, Provo, UT (US)

(73) Assignee: CALDERA ENGINEERING, LC, Provo, UT (US)

( * ) Notice: Subject to any disclaimer, the term of this patent is extended or adjusted under 35 U.S.C. 154(b) by 61 days.

(21) Appl. No.: 16/129,550

(22) Filed: Sep. 12, 2018

(65) Prior Publication Data

US 2020/0018422 A1 Jan. 16, 2020

Related U.S. Application Data

(60) Provisional application No. 62/696,163, filed on Jul. 10, 2018.

(51) Int. Cl.
*F16K 1/34* (2006.01)
*F16K 51/00* (2006.01)

(52) U.S. Cl.
CPC ............... *F16K 51/00* (2013.01); *F16K 1/34* (2013.01); *Y10T 137/0519* (2015.04); *Y10T 403/217* (2015.01)

(58) Field of Classification Search
CPC . F16K 51/00; F16K 1/38; F16K 1/385; F16K 5/0207; F16K 1/36; F16K 1/482; Y10T 137/0519; Y10T 403/217; B23P 15/001
See application file for complete search history.

(56) References Cited

U.S. PATENT DOCUMENTS

| | | | | |
|---|---|---|---|---|
| 1,236,939 A | * | 8/1917 | Huber | F16K 1/487 |
| | | | | 251/86 |
| 1,615,942 A | * | 2/1927 | Grow | A45C 1/02 |
| | | | | 280/47.18 |
| 4,183,500 A | * | 1/1980 | Nightingale | F16K 1/482 |
| | | | | 251/214 |
| 4,315,616 A | * | 2/1982 | Welker | F16K 1/385 |
| | | | | 251/191 |
| 4,575,047 A | | 3/1986 | Boos et al. | |

(Continued)

OTHER PUBLICATIONS

PCT; International Search Report in the PCT Patent Application No. PCT/US2019/040599 dated Sep. 25, 2019.

(Continued)

*Primary Examiner* — Kelsey E Cary
(74) *Attorney, Agent, or Firm* — Snell & Wilmer LLP

(57) ABSTRACT

A plug head assembly having a ceramic plug head having an annular retention groove, wherein the ceramic plug head has a proximal terminus and a distal terminus, a first clamp portion having a first annular retention protrusion conforming to the annular retention groove, a second clamp portion having a second annular retention protrusion conforming to the annular retention groove, and an annular retention sleeve conforming to the annular retention groove, the annular retention sleeve disposed between the annular retention groove and at least one of the first clamp portion and the second clamp portion.

16 Claims, 6 Drawing Sheets

(56) References Cited

U.S. PATENT DOCUMENTS

| | | | |
|---|---|---|---|
| 4,688,757 A * | 8/1987 | Cook | F16K 1/46 |
| | | | 251/210 |
| 4,763,876 A | 4/1988 | Isao | |
| 4,934,857 A * | 6/1990 | Swanson | F16B 5/02 |
| | | | 403/28 |
| 5,201,335 A | 4/1993 | Osgood | |
| 2008/0060704 A1 | 3/2008 | McCarty | |
| 2009/0049671 A1 | 2/2009 | O'Hara | |
| 2010/0140530 A1 | 6/2010 | Robison | |
| 2013/0181154 A1* | 7/2013 | Robison | F16K 99/00 |
| | | | 251/324 |
| 2013/0181155 A1 | 7/2013 | Robison | |
| 2014/0367602 A1* | 12/2014 | Filipow | F16K 1/385 |
| | | | 251/358 |
| 2016/0018007 A1 | 1/2016 | Eckholz | |
| 2018/0149279 A1 | 5/2018 | Mann, III | |
| 2019/0107218 A1 | 4/2019 | Kruppe | |
| 2020/0018412 A1 | 1/2020 | Weber et al. | |

OTHER PUBLICATIONS

PCT; Written Opinion in the PCT Patent Application No. PCT/US2019/040599 dated Sep. 25, 2015.

U.S.; Restriction Requirement in the U.S. Appl. No. 16/129,603 dated Apr. 7, 2020.

USPTO; Non-Final Office Action in the U.S. Appl. No. 16/129,603 dated Apr. 30, 2020.

* cited by examiner

SYSTEMS AND METHODS FOR A PLUG HEAD ASSEMBLY

CROSS-REFERENCE TO RELATED APPLICATION

This application claims the benefit of and priority to U.S. Provisional Application Ser. No. 62/696,163, filed Jul. 10, 2018, the contents of which are hereby incorporated by reference in their entirety.

BACKGROUND

In valve assemblies, fluid flow is controlled by actuating a plug head assembly relative to a valve seat. In extreme operating environments, such as at elevated temperatures, pressures and/or corrosive or abrasive fluids, the components of a plug head assembly may weaken or become more loosely coupled than intended. For example, where a ceramic plug head is retained by a conventional retainer apparatus, the retainer apparatus may expand at a higher rate than the ceramic plug head, thus making the fit between the retainer apparatus and the ceramic plug head loose. In addition, thermal events and crushing lodged solids may cause fractures in a ceramic plug head, which may then separate from the plug head assembly or compromise the integrity of the plug head ceramic.

Ceramic plug heads, such as plug heads comprised of sintered silicon carbide (SSiC), are often used in extreme operating environments, such as high-temperature applications (e.g., from about 20° C. to about 260° C.), and/or high-pressure applications (e.g., from about 5 bar to about 47 bar), and/or applications involving highly erosive and/or corrosive fluids and/or slurries. Slurries contain both solids and fluids, which may flow at high velocities. Thus, solid particles traveling at high velocities also comprise an extreme operating environment.

SUMMARY

In various embodiments, a plug head assembly is provided comprising, a ceramic plug head having an annular retention groove, wherein the ceramic plug head has a proximal terminus and a distal terminus, a first clamp portion having a first annular retention protrusion conforming to the annular retention groove, a second clamp portion having a second annular retention protrusion conforming to the annular retention groove, and an annular retention sleeve conforming to the annular retention groove, the annular retention sleeve disposed between the annular retention groove and at least one of the first clamp portion and the second clamp portion.

In various embodiments, a method of assembling a plug head assembly, comprising, disposing an annular retention sleeve in an annular retention groove of a ceramic plug head, disposing an annular retention ring about a proximal circumference of the ceramic plug head, disposing a first annular retention protrusion of a first clamp portion in the annular retention groove, and disposing a second annular retention protrusion of a second clamp portion in the annular retention groove.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Plug head assemblies in accordance with the present disclosure may be suitable for use in environments that include high temperatures, corrosive fluid flows, fluid flows that contain particulate matter, and fluid flows that are under high pressure. In that regard, plug head assemblies in accordance with the present disclosure may include a ceramic portion for increased resistance to corrosion and/or erosion, as well as for enhances durability. The ceramic portion may comprise, for example, one or more of silicon carbide (SiC), boron carbide ($B_4C$) and zirconia ($ZrO_2$). Ceramics typically have a lower coefficient of thermal expansion (CTE) than, for example, many metals and metal alloys. Given disparate CTEs of materials, retention of the ceramic portion to other portions of a plug assembly become important in high temperature environments.

Figure 1:
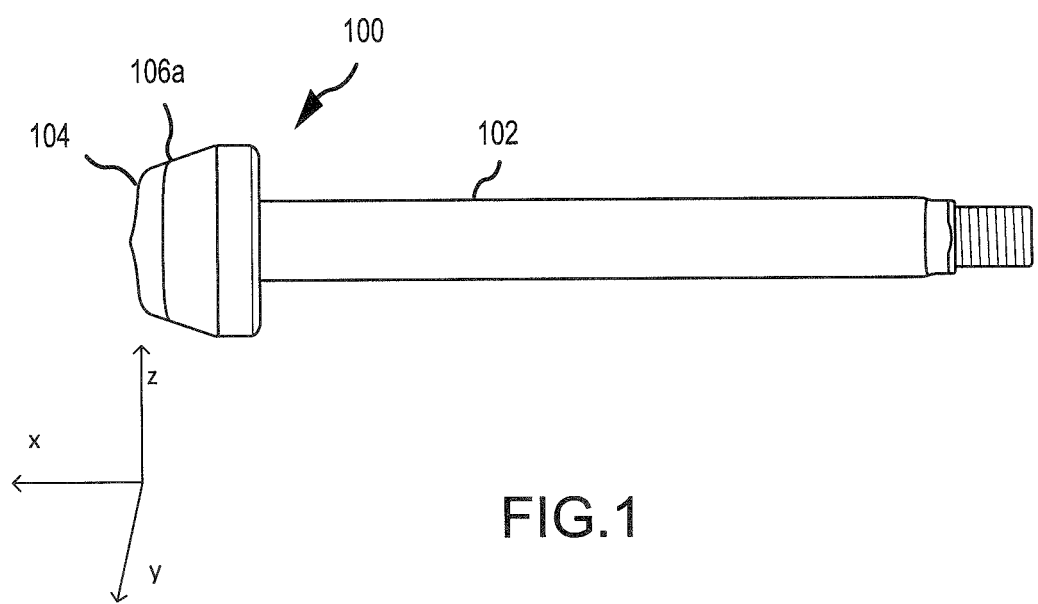
FIG. 1 illustrates a plug head assembly in accordance with various embodiments.
Figure 2:
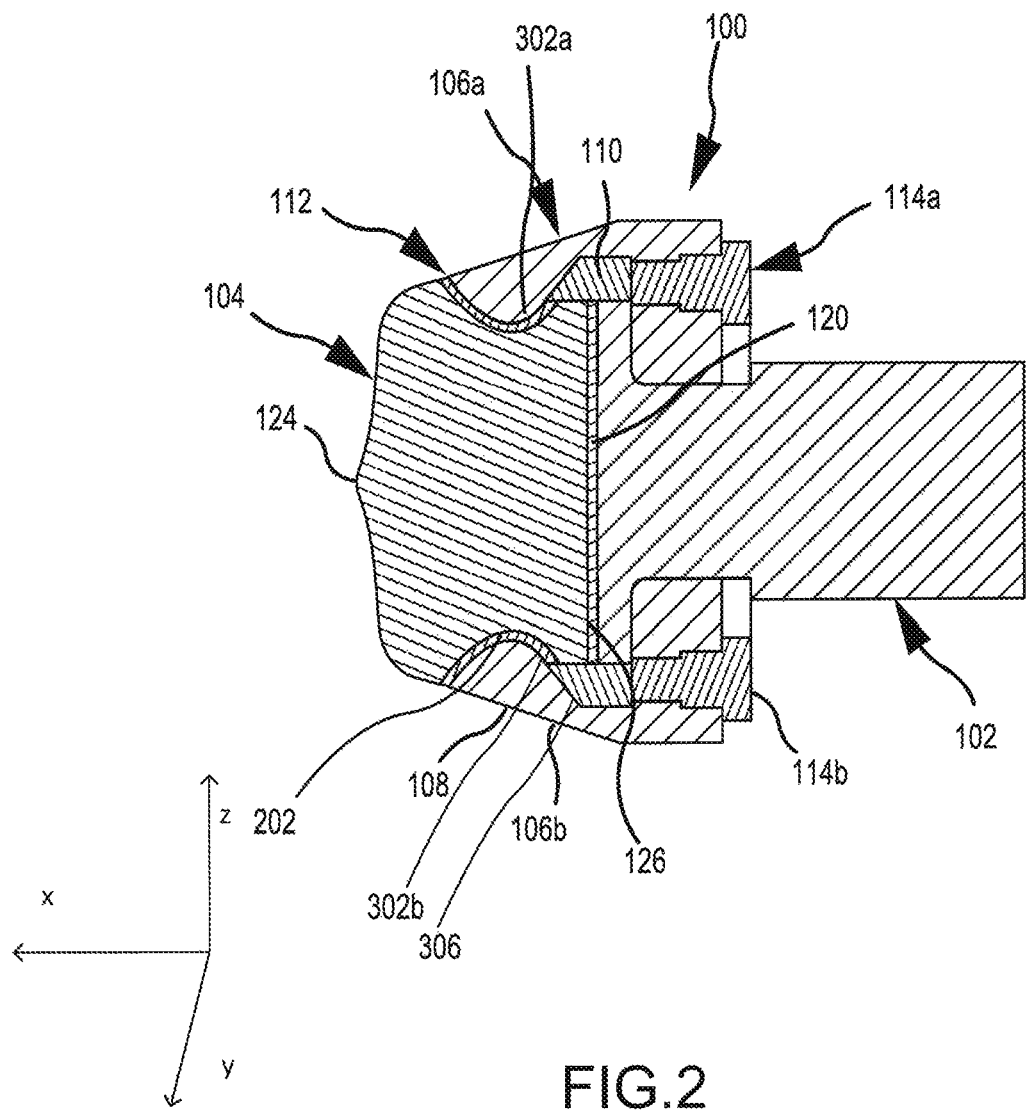
FIG. 2 illustrates a cross section view of the plug head assembly of FIG. 1, in accordance with various embodiments.

With reference to FIGS. 1 and 2, a plug head assembly 100 is shown in cross section. X-y-z axes are shown for convenience. The x direction may be referred to as an axial direction and the z direction and y direction may be referred to a radial directions. It should be noted that a first component shown displaced in a positive axial direction (positive x direction) with respect to second component may be referred to as distal to the second component and a first component shown displaced in a negative axial direction (negative x direction) with respect to second component may be referred to as proximal to the second component.

The circumferential direction may refer to an arc or circle that extends from the y axis to the z axis.

Plug head assembly 100 comprises translating stem 102, which extends proximally. Translating stem 102 may comprise one or more erosion and/or corrosion resistant metals, for example, various steel alloys, stainless steel, titanium, titanium alloys, zirconium, zirconium alloys, and/or nickel chromium alloys, such as an austenitic nickel-chromium alloy such as the austenitic nickel-chromium alloy sold under the trademark INCONEL. Nickel chromium alloys may be well suited to high temperature environments. Translating stem 102 may comprise metal with a thin ceramic coating.

Plug head assembly 100 further comprises plug head 104. Plug head 104 may comprise one or more suitable ceramic materials. Plug head 104 may comprise, for example, one or more of silicon carbide (SiC), boron carbide ($B_4C$), tungsten carbide (WC) and zirconia ($ZrO_2$). In various embodiments, plug head 104 comprises silicon carbide.

Figure 3:
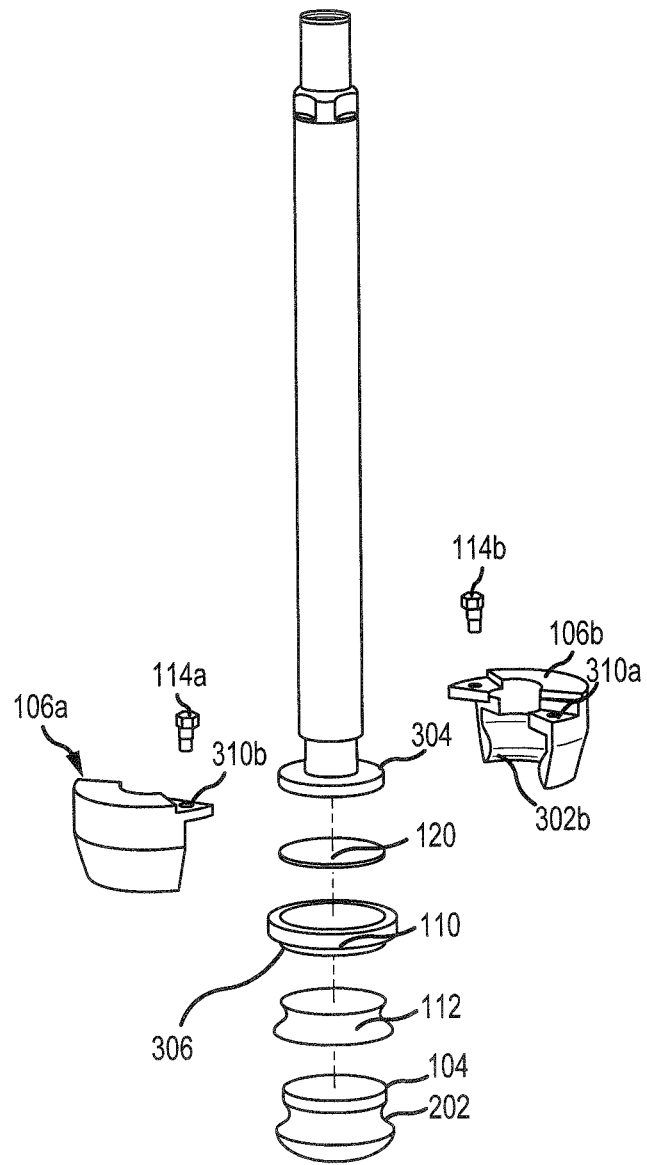
FIG. 3 illustrates an exploded view of the plug head assembly of FIG. 1, in accordance with various embodiments.

With added reference to FIG. 3, plug head 104 comprises an annular retention groove 202. Annular retention groove 202 circumscribes plug head 104. In that regard, annular retention groove 202 comprises a cross sectional profile of one or more arcs in plug head 104. For example, with particular references to FIG. 2, annular retention groove 202 may comprise an arc of a single radius of curvature. In various embodiments, however, annular retention groove 202 may comprise a profile of multiple radii of curvature. Annular retention groove 202 may have a radius that is greater on the distal end than the proximal end.

In various embodiments, plug head 104 may have a contoured surface 124. Contoured surface 124 may be parabolic, elliptical, spherical, or any other suitable geometry. For example, as shown in FIGS. 1 and 2, contoured surface 124 has a central protrusion that protrudes in the distal direction and a surface that sweeps proximally in the radial direction. Contoured surface 124 may take any suitable shape and be configured to be for use with a variety of valve seat assemblies. The central protrusion on contoured surface 124 acts as the distal terminus for plug head 104. The proximal terminus 126 of plug head 104 is shown in contact with gasket 120.

In various embodiments, annular retention sleeve 112 is disposed at least partially within annular retention groove 202. In that regard, annular retention sleeve 112 at least partially may assume the contours of annular retention groove 202. In various embodiments, annular retention sleeve 112 covers all the external surface area of annular retention groove 202. Annular retention sleeve 112 may comprise polytetrafluoroethylene (PTFE) and/or expanded PTFE. Annular retention sleeve 112 may rigid, semi-rigid, or otherwise mechanically compliant PTFE. Annular retention sleeve 112 may also comprise rubber, synthetic rubber, silicone, and/or other materials that have a higher CTE than silicon carbide and stainless steel. In applications where operating temperatures may exceed 260° C., the use of PTFE as an annular retention sleeve 112 may not be appropriate. Thus, in applications where operating temperatures may exceed 260° C., annular retention sleeve 112 may comprise a metal or metal alloy having a CTE that is higher than silicon carbide and stainless steel. For example, annular retention sleeve 112 may comprise aluminum, tin, zinc, and other suitable metals and metal alloys.

In various embodiments, first clamp portion 106a and second clamp portion 106b surround plug head 104. Each of first clamp portion 106a and second clamp portion 106b extend beyond one hundred eighty degrees (180°) around plug head 104, overlapping at the interface between first clamp portion 106a and second clamp portion 106b. In that regard, a portion of may overlap with second clamp portion 106b, thus facilitating their coupling as described herein. However, in various embodiments, more than two clamp portions may be present. For example, in various embodiments, three clamp portions may be used, each surrounding plug head 104 about one hundred twenty degrees (120°).

The distal portions of first clamp portion 106a and second clamp portion 106b may comprise annular retention protrusions, such as first annular retention protrusion 302a and second annular retention protrusion 302b. The annular retention protrusions comprise a portion of first clamp portion 106a and second clamp portion 106b, respectively that extends radially inward. The first annular retention protrusion 302a and second annular retention protrusion 302b conform to the geometry of annular retention groove 202 and annular retention sleeve 112. In that regard, first annular retention protrusion 302a and second annular retention protrusion 302b may comprise an arc of a single radius of curvature. In various embodiments, however, first annular retention protrusion 302a and second annular retention protrusion 302b may comprise a profile of multiple radii of curvature. First clamp portion 106a and second clamp portion 106b may be made from any suitable material, one or more metals, for example, various steel alloys, stainless steel, titanium, titanium alloys, zirconium, zirconium alloys, and/or nickel chromium alloys, such as an austenitic nickel-chromium alloy such as the austenitic nickel-chromium alloy sold under the trademark INCONEL. Nickel chromium alloys, as well as titanium and zirconium, may be well suited to high temperature environments.

Figure 5:
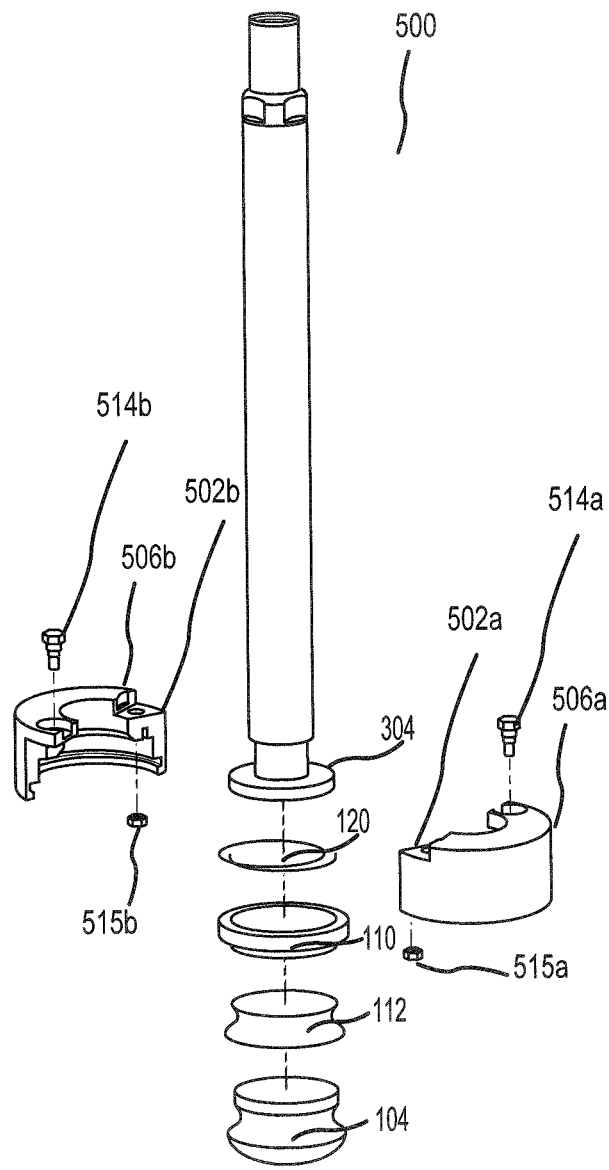
FIG. 5 illustrates an exploded view of a plug head assembly, in accordance with various embodiments.

First clamp portion 106a and second clamp portion 106b may receive shoulder bolts 114a and 114b, respectively. As first clamp portion 106a and second clamp portion 106b are coupled, distal aperture 310a overlaps with and is distal to proximal aperture 310b. Shoulder bolts 114a and 114b may threadingly engage with respective apertures in first clamp portion 106a and second clamp portion 106b. For example, bolt 114a may be threaded through proximal aperture 310b and distal aperture 310a. As, for example, shoulder bolt 114a is turned, first clamp portion 106a may be drawn in the direction of distal flange 304 of translating stem 102. The first annular retention protrusion 302a may thus interact with annular retention groove 202 and annular retention sleeve 112, exerting tension in the axial direction. In this manner, shoulder bolts 114a and 114b keep first clamp portion 106a and second clamp portion 106b retained against translating stem 102. With reference to FIG. 5, plug head assembly 500 is shown. Plug head assembly 500 is similar to plug head assembly 100, though first clamp portion 506a and second clamp portion 506b have recessed portions 502a and 502b to receive bolts 514a and 514b. In this regard, bolts 514a and 514b may be mounted flush or substantially flush in first clamp portion 506a and second clamp portion 506b. Bolts 514a and 514b may be secured with nuts 515a and 515b.

Figure 6:
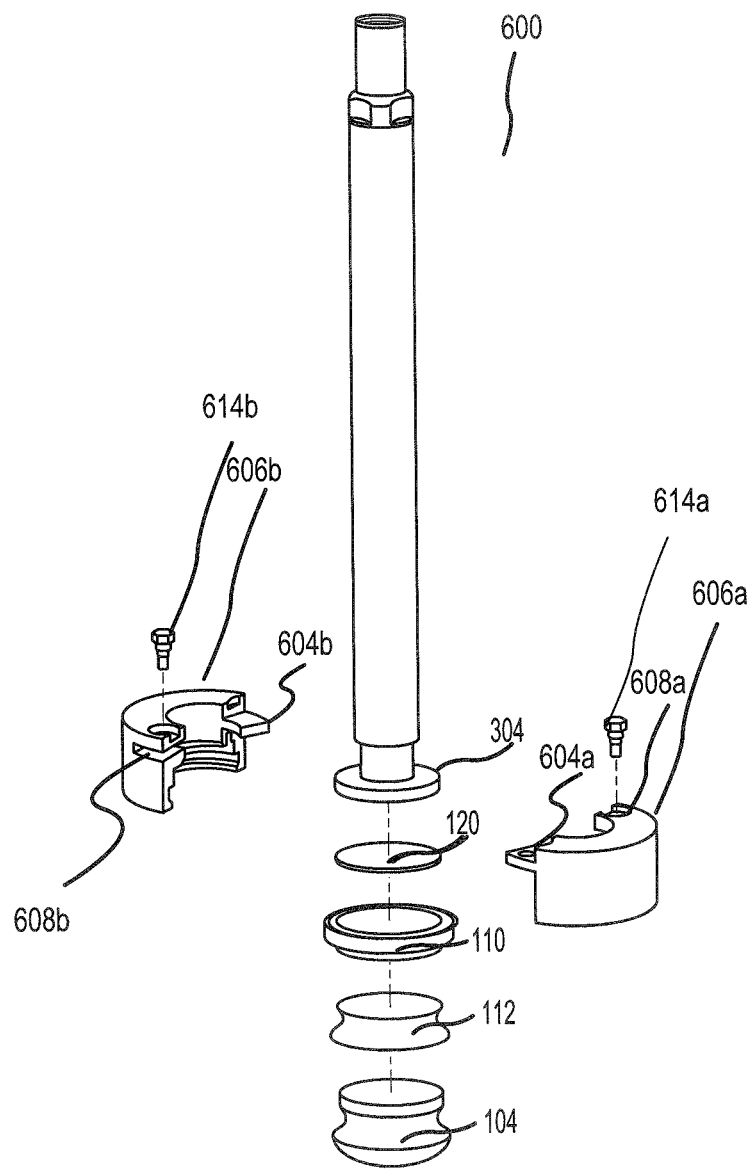
FIG. 6 illustrates an exploded view of a plug head assembly having tabs, in accordance with various embodiments.

With reference to FIG. 6, plug head assembly 600 is shown. Plug head assembly 600 is similar to plug head assembly 500, though first clamp portion 606a and second clamp portion 606b have protruding portions 604a and 604b which are configured to be received into recesses 608a and 608b. In the illustrated embodiment, the interaction of protruding portions 604a and 604b into recesses 608a and 608b may improve alignment, which tends to ease assembly. First clamp portion 606a and second clamp portion 606b may be secured by bolts 514a and 514b.

With reference back to FIGS. 1, 2, and 3, stem 102 comprises distal flange 304. Gasket 120 may be disposed between plug head 104 and distal flange 304. Gasket 120 may comprise polytetrafluoroethylene (PTFE) and/or expanded PTFE. Gasket 120 may be rigid, semi-rigid, or otherwise mechanically compliant PTFE. Gasket 120 may also comprise rubber, synthetic rubber, silicone, and/or other materials that have a higher CTE than silicon carbide and stainless steel. In applications where operating temperatures may exceed 260° C., the use of PTFE as a gasket 120 may not be appropriate. Thus, in applications where operating temperatures may exceed 260° C., gasket 120 may comprise a metal or metal alloy having a CTE that is higher than silicon carbide and stainless steel. For example, gasket 120 may comprise aluminum, tin, zinc, and other suitable metals and metal alloys.

In various embodiments, gasket 120 has a CTE that is higher than the CTE of plug head 104 and/or first clamp portion 106a and second clamp portion 106b. In that regard, in response to an increase in temperature, gasket 120 may expand in an axial direction, exerting a force on plug head 104, urging it to extend distally. Gasket 120 has a higher CTE than the CTE of plug head 104, thus gasket 120 will expand axially at a greater rate than plug head 104. As noted above, the first clamp portion 106a and second clamp portion 106b interact with plug head 104 via first annular retention protrusion 302a and second annular retention protrusion 302b, acting to retain plug head 104 within plug head assembly 100.

Annular retention ring 110 circumscribes distal flange 304, gasket 120, and a proximal portion of plug head 104. Annular retention ring 110 may comprise polytetrafluoroethylene (PTFE) and/or expanded PTFE. Annular retention ring 110 may be rigid, semi-rigid, or otherwise mechanically compliant PTFE. Annular retention ring 110 may also comprise rubber, synthetic rubber, silicone, and/or other materials that have a higher CTE than silicon carbide and stainless steel. In applications where operating temperatures may exceed 260° C., the use of PTFE as an annular retention ring 110 may not be appropriate. Thus, in applications where operating temperatures may exceed 260° C., annular retention ring 110 may comprise a metal or metal alloy having a CTE that is higher than silicon carbide and stainless steel. For example, annular retention ring 110 may comprise aluminum, tin, zinc, and other suitable metals and metal alloys. In various embodiments, annular retention ring 110 has a CTE that is higher than the CTE of plug head 104 and/or first clamp portion 106a and second clamp portion 106b. In that regard, in response to an increase in temperature, annular retention ring 110 may expand in an axial direction, exerting a force on plug head 104, urging it to extend distally. Annular retention ring 110 has a higher CTE than the CTE of plug head 104, thus annular retention ring 110 will expand axially at a greater rate than plug head 104. As noted above, the first clamp portion 106a and second clamp portion 106b interact with plug head 104 via first annular retention protrusion 302a and second annular retention protrusion 302b, acting to retain plug head 104 within plug head assembly 100. In addition, annular retention ring 110 may expand radially in response to an increase in temperature. In this regard, annular retention ring 110 exerts a radial compressive force on plug head 104, gasket 120, and distal flange 304, which tends to retain plug head 104, gasket 120, and distal flange 304 to one another. Annular retention ring 110 may comprise beveled surface 306. Beveled surface 306 may comprise a bevel in annular retention ring 110 along an annular distal portion of annular retention ring 110, though in various embodiments annular retention ring 110 may comprise a flange that extends distally. Beveled surface 306 may contact the first annular retention protrusion and the second annular retention protrusion, as shown in FIG. 2. Moreover, annular retention ring 110 has an inner diameter surface and an outer diameter surface, wherein at least a portion of the inner diameter surface is in contact with distal flange 304, gasket 120, and plug head 104. At least a portion of the outer diameter surface of annular retention ring 110 is in contact with first clamp portion 106a and second clamp portion 106b.

Figure 4:
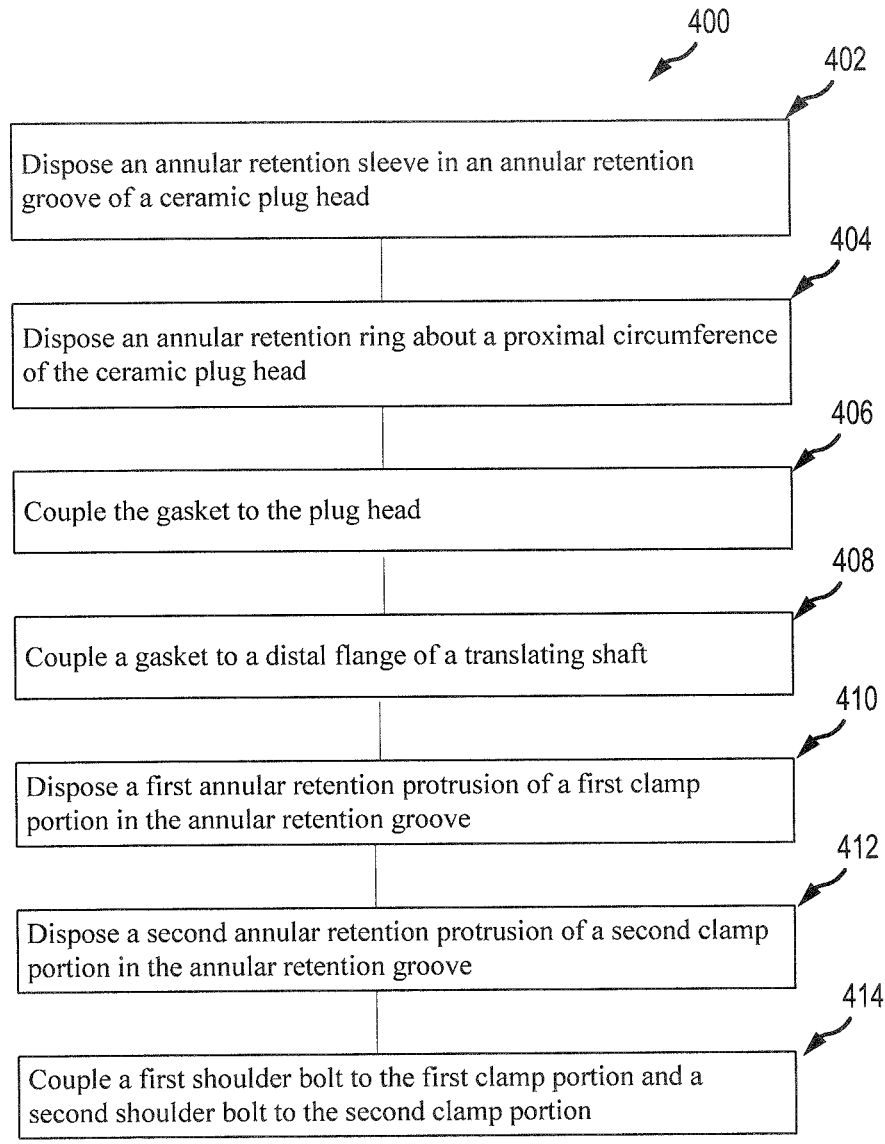
FIG. 4 illustrates a method of assembling a plug head assembly.

With reference to FIG. 4, a method 400 of assembling a plug head assembly is provided. With additional reference to FIGS. 1, 2, and 3, method 400 comprises disposing an annular retention sleeve 112 in an annular retention groove 202 of a ceramic plug head 104 (step 402). Step 404 comprises disposing an annular retention ring 110 about a proximal circumference of the ceramic plug head 104. Step 406 coupling gasket 120 to plug head 104. Step 408 comprises coupling gasket 120 to distal flange 304. Step 410 comprises disposing a first annular retention protrusion 302a of a first clamp portion 106a in the annular retention groove 202. Step 412 comprises disposing a second annular retention protrusion 302b of a second clamp portion 106b in the annular retention groove 202. Step 414 comprises coupling first shoulder bolt 114a to first clamp portion 106a and coupling second shoulder bolt 114b to second clamp portion 106b, As described above, plug head assemblies disclosed herein that comprise PTFE annular retention sleeves, gaskets, and/or annular retention rings may be suitable for use in applications where operating temperature range from about 100° C. to about 260° C. and from about 20° C. to about 260° C., where the term about in this context only means+/−5° C. Plug head assemblies disclosed herein may be suitable for use in applications where operating temperature range from about 260° C. to about 1000° C. and from about 260° C. to about 500° C., where the term about in this context only means+/−5° C., in embodiments having metal or metal alloy annular retention sleeves, gaskets, and/or annular retention rings, as described herein. Plug head assemblies disclosed herein may be suitable for use in high pressure applications (e.g., from about 5 bar to about 47 bar and from about 5 bar to about 20 bar where the term about in this context only means+/−1 bar), and/or applications involving highly erosive and/or corrosive fluids and/or slurries. In that regard, the ceramic plug head of a plug head assembly has a CTE that is lower than various other components of the plug head assembly. Thus, it is beneficial for a plug head assembly to retain the ceramic plug head despite the intended operating conditions.

In this regard, the annular retention groove of the ceramic plug head provides a surface through which the annular protrusions of the clamp portions may interact, via the annular sleeve, to retain the ceramic plug head within the plug head assembly. As the clamp portions expand in the radial directions, the annular retention sleeve expands more rapidly, as it has a higher CTE than the clamp portions. This expansion provides a radial compressive force that aids in ceramic plug head retention. In addition, the annular retention ring, given its high CTE, expands as well, also providing a radial compressive force that aids in ceramic plug head retention. Moreover, the annular retention ring expands axially, placing a force in the distal direction against the annular protrusions of the clamp portions. The gasket also expands axially in response to an increase in temperature, urging ceramic plug head in a distal direction and forcing ceramic plug head to interact with the annular protrusions. In that regard, plug head assemblies as disclosed herein may be able to function at high-temperatures and/or high-pressures and may still be able to retain the ceramic plug head. Moreover, plug head assemblies as disclosed herein offer a smooth transition from the metal components (e.g. the clamp portions) to the ceramic components (e.g., the ceramic plug head). A smooth transition reduces the opportunity for erosion of the plug assembly. In addition, the smooth transition reduces the opportunity to catch and crush particles between the plug head assembly and a seat.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A plug head assembly comprising:
    a ceramic plug head having an annular retention groove disposed on an outer surface of the ceramic plug head, wherein the ceramic plug head has a proximal terminus and a distal terminus;
    a first clamp portion having a first annular retention protrusion disposed on an interior surface of the first clamp portion and conforming to the annular retention groove;
    a second clamp portion having a second annular retention protrusion disposed on an interior surface of the second clamp portion and conforming to the annular retention groove;
    an annular retention sleeve conforming to the annular retention groove, the annular retention sleeve disposed between the annular retention groove and at least one of the first clamp portion and the second clamp portion
    a gasket disposed on a proximal portion of the ceramic plug head;
    a translating shaft having a distal flange, the distal flange in contact with the gasket;
    an annular retention ring circumscribing the distal flange, gasket, and the proximal portion of the ceramic plug head, the annular retention ring configured to contact at least one of the first clamp portion and the second clamp portion; and
    wherein the first clamp portion and the second clamp portion circumscribe the annular retention ring, the annular retention ring in contact with the first annular retention protrusion and the second annular retention protrusion.

2. The plug head assembly of claim 1, wherein the first clamp portion is retained by a shoulder bolt.

3. The plug head assembly of claim 1, wherein the annular retention groove has at least two radii of curvature.

4. The plug head assembly of claim 1, wherein the ceramic plug head has a greater radius on the distal terminus than the proximal terminus.

5. The plug head assembly of claim 1, wherein the ceramic plug head has a minimum radius located within the annular retention groove.

6. The plug head assembly of claim 1, wherein the ceramic plug head has first coefficient of thermal expansion (CTE), the first clamp portion and the second clamp portion have a second CTE, and the annular retention sleeve has a third CTE, the third CTE being greater than the second CTE and the second CTE being greater than the first CTE.

7. The plug head assembly of claim 6, wherein the ceramic plug head comprises at least one of silicon carbide, boron carbide, tungsten carbide, or zirconia.

8. The plug head assembly of claim 7, wherein the annular retention sleeve comprises polytetrafluoroethylene.

9. The plug head assembly of claim 8, wherein the annular retention ring comprises polytetrafluoroethylene and wherein the first clamp portion and the second clamp portion comprise stainless steel.

10. The plug head assembly of claim 1, wherein the first clamp portion has a first recess and a first protruding portion, wherein the second clamp portion has a second recess and a second protruding portion, the first protruding portion configured to fit within the second recess and the second protruding portion configured to fit within the first recess.

11. A method of assembling a plug head assembly, comprising:
    disposing an annular retention sleeve in an annular retention groove of a ceramic plug head, the annular retention groove disposed on an outer surface of the ceramic plug head;

disposing an annular retention ring about a proximal circumference of the ceramic plug head;

disposing a first annular retention protrusion of a first clamp portion in the annular retention groove, the first annular retention protrusion disposed on an interior surface of the first clamp portion, the first annular retention protrusion contacting the annular retention sleeve; and disposing a second annular retention protrusion of a second clamp portion in the annular retention groove, the second annular retention protrusion disposed on an interior surface of the second clamp portion, the second annular retention protrusion contacting the annular retention sleeve, wherein the first clamp portion and the second clamp portion circumscribe the annular retention ring, the annular retention ring in contact with the first annular retention protrusion and the second annular retention protrusion.

12. The method of claim 11, further comprising attaching a shoulder bolt to the first clamp portion.

13. The method of claim 11, further comprising coupling a gasket to the ceramic plug head.

14. The method of claim 13, further comprising coupling a distal flange of a translating shaft to the gasket.

15. A plug head assembly comprising:

a ceramic plug head having an annular retention groove disposed on an outer surface of the ceramic plug head, wherein the ceramic plug head has a proximal terminus and a distal terminus;

a first clamp portion having a first annular retention protrusion disposed on an interior surface of the first clamp portion and conforming to the annular retention groove;

a second clamp portion having a second annular retention protrusion disposed on an interior surface of the second clamp portion and conforming to the annular retention groove;

an annular retention sleeve conforming to the annular retention groove, the annular retention sleeve disposed between the annular retention groove and at least one of the first clamp portion and the second clamp portion;

a gasket disposed on a proximal portion of the ceramic plug head;

a translating shaft having a distal flange, the distal flange in contact with the gasket; and an annular retention ring circumscribing the distal flange, gasket, and the proximal portion of the ceramic plug head, the annular retention ring configured to contact at least one of the first clamp portion and the second clamp portion, wherein the annular retention ring has an inner diameter surface and an outer diameter surface, wherein at least a portion of the inner diameter surface is in contact with the distal flange, the gasket, and the ceramic plug head and wherein at least a portion of the outer diameter surface is in contact with the first clamp portion and the second clamp portion.

16. The plug head assembly of claim 15, wherein the annular retention ring has a beveled surface, the beveled surface in contact with the first annular retention protrusion and the second.

* * * * *